US011571967B2

(12) United States Patent
Vercellino et al.

(10) Patent No.: US 11,571,967 B2
(45) Date of Patent: Feb. 7, 2023

(54) SIMPLIFIED SYSTEM FOR DISCONNECTING A POWER OUTLET OF A CARDAN IN A VEHICLE WITH A TRAILER

(71) Applicant: ETACARINAE S.R.L., Aqui Terme (IT)

(72) Inventors: Pierangelo Vercellino, Alice Bel Colle (IT); Valerio Raganelli, Prasco (IT)

(73) Assignee: ETACARINAE S.R.L., Acqui Terme (IT)

( * ) Notice: Subject to any disclaimer, the term of this patent is extended or adjusted under 35 U.S.C. 154(b) by 355 days.

(21) Appl. No.: 16/758,890

(22) PCT Filed: Oct. 24, 2017

(86) PCT No.: PCT/IT2017/000234
§ 371 (c)(1),
(2) Date: Apr. 24, 2020

(87) PCT Pub. No.: WO2019/082213
PCT Pub. Date: May 2, 2019

(65) Prior Publication Data
US 2021/0176910 A1 Jun. 17, 2021

(51) Int. Cl.
*B60K 25/06* (2006.01)
*B60D 1/145* (2006.01)
(52) U.S. Cl.
CPC .............. *B60K 25/06* (2013.01); *B60D 1/145* (2013.01)
(58) Field of Classification Search
CPC ................................ B60K 25/06; B60D 1/145
(Continued)

(56) References Cited

U.S. PATENT DOCUMENTS 5,320,186 A 6/1994 Strasser et al.
2007/0027581 A1* 2/2007 Bauer .................... B60W 30/08
701/1
(Continued)

FOREIGN PATENT DOCUMENTS

DE  102015112054 A1  1/2016
FR  3027426 A1  4/2016
(Continued)

OTHER PUBLICATIONS

International Search Report & Written Opinion received for the PCT Application No. PCT/IT2017/000234, dated Jul. 16, 2018, 10 pages.

*Primary Examiner* — Colby M Hansen
(74) *Attorney, Agent, or Firm* — Steven M. Hertzberg

(57) ABSTRACT

Disclosed herein is a vehicle (1)—preferably a tractor—with a trailer (2) operatively connected thereto with a cardan (3), said cardan (3) comprising a power take-off, said power take-off being switched off when said cardan (3) builds with said vehicle (1) and/or with said trailer (2) an angle ($\epsilon$) smaller than a first threshold value ($\alpha$) and/or larger than a second threshold value ($\beta$) and being switched on when said angle ($\epsilon$) exceeds again said first threshold value ($\beta$) thanks to suitable actuators, including detection means of the angle formed between the cardan (3) and said vehicle and/or trailer. According to the present invention, said angle ($\epsilon$) is detected by a detector consisting of a magnetic device (4) placed on the trailer (2) or the vehicle (1) and an electronic compass (5) placed on the vehicle (1) or on the trailer (2). Preferably, the angle ($\epsilon$) insisting on the cardan (3) is obtained according to the formula: $\epsilon = 180 - Y - \arcsen(l/m\ \sen\ y)$ (3) where y is the angle the compass (5) forms with respect to the straight travel with the magnet (4), l is the
(Continued)

distance between the cardan (3) and the compass (5), m is the distance between the cardan (3) and the magnet (4).

14 Claims, 4 Drawing Sheets

(58) Field of Classification Search
USPC .......................................................... 310/92
See application file for complete search history.

(56) References Cited

U.S. PATENT DOCUMENTS

2014/0303849 A1   10/2014  Hafner et al.
2022/0004183 A1*   1/2022  Raeis Hosseiny . B62D 15/0285

FOREIGN PATENT DOCUMENTS

| | | |
|---|---|---|
| GB | 1088954 A | 10/1967 |
| WO | 9956978 A1 | 11/1999 |
| WO | 2017125863 A1 | 7/2017 |

* cited by examiner

SIMPLIFIED SYSTEM FOR DISCONNECTING A POWER OUTLET OF A CARDAN IN A VEHICLE WITH A TRAILER

CROSS REFERENCE TO RELATED APPLICATION

This application claims benefit under 35 U.S.C. § 371 to international application No. PCT/IT2017/000234, filed on Oct. 24, 2017, the content of which is incorporated by reference in its entirety.

TECHNICAL FIELD

The present invention relates to a system for disconnecting a power outlet of a cardan in a vehicle with trailer, preferably a towed trailer, preferably, but not exclusively, an agricultural tractor.

BACKGROUND OF THE INVENTION

Agriculture is one of the earliest productive activities in human history. The discovery of the possibility of re-obtaining a certain plant, dropping its seeds into the soil and selecting from time to time the seeds from the plants with the best fruit, had a huge impact on man, who could thus dramatically change his lifestyle, being able to settle in a place he felt most appropriate and no longer having to continue to chase animals as they were extinct in an area. Moreover, the discovery of agriculture has made it possible to preserve more animal species in places where such discovery occurred earlier, thus ensuring a greater biodiversity.

Agriculture has always required the preparation of a soil to receive a crop. Generally, all plants that can damage the crop (commonly called weeds) are eliminated, after which the soil is tilled by turning it over, so that it becomes accessible for seeds that will be planted in it; the final step is irrigation, in order to satisfy the need of the plants for water.

Soil was originally tilled by hand, with tools such as hand ploughs, still used in poor areas, where agriculture is of a very traditional or even old-fashioned type and where the economic resources needed to purchase the most varied equipment are scarce.

A first improvement was when the plough was pulled by animals, especially oxen, extremely strong and at the same time very patient and governable animals, so that they could be guided without risks and with excellent results, even by a single person.

With the discovery of the combustion engine, oxen were progressively replaced by tractors and other similar agricultural machines, which today have actually replaced working animals.

Tractors are of different types. As for the movement, they can be wheeled or tracked, according to what is needed. They may have trailers that can be carried or towed. A carried trailer is a trailer that is placed on the tractor's fork and is lifted and lowered, usually carried in front of the tractor. A towed trailer is a trailer that is fastened to a towing eye and dragged passively, usually behind.

Today it is common practice that trailers carry other agricultural machines, such as sprayers, lawn mowers and others. They are normally driven by the force transmitted by a cardan, operatively connected to the power outlet of the tractor. The cardan is able to rotate, due to the action of the power outlet, while the trailer is pulled, easily compensating for small rotations and bumps of limited magnitude. Nevertheless, the cardan, although it allows to perform safely small curves, tends to break at angles between the tractor and the trailer below 145° (measured both clockwise and counter-clockwise) if it continues to rotate. For this reason, it is a normal practice to switch off the power outlet of the tractor, placing it in the idle state whenever a relatively sharp bend is present, to prevent the rupture of the cardan, which would result in stopping the processing and in replacing the cardan, with the consequent downtime and replacement costs.

This operation, although conceptually simple, is part of a series of operations that require a lot of concentration on the part of the operator, also taking into account the difficulty related to the terrain normally encountered by tractors, which are sometimes even dangerous to operators. For this reason, it is not uncommon that the operator, being distracted by other tasks, forgets to switch off the power outlet, breaking the cardan, or to switch it back on once the bend is completed, leaving the job incomplete and often having to repeat it with increased costs and prolonged times.

U.S. Pat. No. 5,320,186 describes a system for changing the position and the speed of a connection for the power outlet in a tractor with a carried tool. The term "carried tool" means, as already explained, that the tool is carried on the hydraulic lifting device of the tractor. Carried loads and trailed loads have very different characteristics between each other. While driving, the operator can raise or lower the connection position to connect a trailer tool. The connection position and, as a consequence, the speed of the same are detected. By means of an algorithm, the error of the speed measurement is calculated and, according to the result, the connection is raised or lowered via a solenoid valve. The system records the optimum values, so as to accelerate the calculations. Finally, a potentiometer for the speed drop allows to obtain the desired speed. This system is very useful, but it still requires the fully conscious and voluntary action of the operator for the disengagement and engagement of the power outlet and does not solve the previously-mentioned issues.

GB 1088954 discloses an energy transmission through a shaft assembly, to be connected to the power outlet of a tractor by means of a universal joint, with a resilient suspension system on the joint, so as to allow a movement without obstacles.

WO99/56 978 discloses a process for the control of a cardan for power transmission. It provides an insertion/exclusion valve of the cardan. Through this valve, the cardan can be inserted/excluded.

US2014/0303849 discloses a method for detecting the position of a trailer with respect to a vehicle. In this way, the trajectory that can be inserted in a curvature control device is determined.

To overcome these drawbacks, the Applicants of the present application have filed patent application PCT/IB2017/050265, wherein described is a vehicle with trailer operatively connected thereto with a cardan, said cardan comprising a power outlet, said power outlet being switched off when said cardan builds with said vehicle and/or with said trailer an angle smaller than a first threshold value and/or larger than a second threshold value and being switched on when said angle exceeds again said first threshold value or goes below said second threshold value, thanks to suitable actuators, comprising angle detection means between the steering wheels and the vehicle axle and means apt to correlate said angle between the steering wheels and the vehicle axle with the angle comprised between the cardan and said vehicle and/or trailer. The angle (ε) to be compared with the threshold value is calculated according to the relation:

$$\varepsilon = \delta - \arcsen(m/l * \sen \delta) \qquad (1)$$

wherein:
m=length of an arm of the cardan
l=length of another arm of the cardan
δ=angle between the steering wheels and the vehicle axle.

This vehicle, although it solves almost all the experienced drawbacks, cannot, however, work in the case of a tracked vehicle, because this tracked vehicle is steered by blocking a number of tracks and not turning the wheels around their support, which is why there is no possibility to evaluate the angle δ. Also, it is normally not suitable for use with a carried load.

SUMMARY OF THE INVENTION

The underlying problem of the invention is to propose a vehicle structure with a trailer that overcomes the aforementioned drawbacks, and which allows to measure the crossing, in one direction or another, of a threshold angle, regardless of the vehicle type, particularly whether it is a wheeled or tracked vehicle. This object is achieved through a simplified system for disconnecting a power outlet of a cardan in a vehicle with a trailer operatively connected thereto with a cardan by a power outlet, said system disconnecting said power outlet when said cardan forms with said vehicle and/or with said trailer an angle smaller than a first threshold value and/or greater than a second threshold value and switching it back on when said angle exceeds said first threshold value again and/or goes below said second threshold value, thanks to suitable actuators, capable of cooperating with means for detecting the angle formed between the cardan and said vehicle and/or trailer, characterised in that a detector constituted by a magnetic device placed on the trailer or vehicle and by an electronic compass on the vehicle or on the trailer is capable of detecting measures related to said angle. The dependent claims disclose preferred features of the invention.

BRIEF DESCRIPTION OF THE DRAWINGS

Further features and advantages of the invention will anyhow be more apparent from the following detailed description of a preferred embodiment, given by mere way of non-limiting example and illustrated in the accompanying drawings, wherein.

BEST MODE FOR CARRYING OUT THE INVENTION

Figure 1:
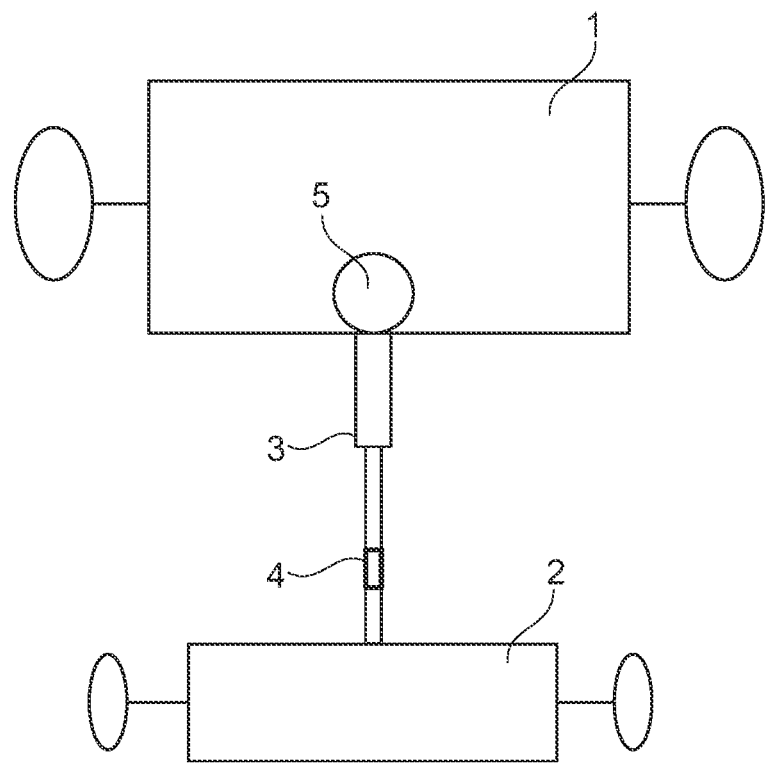
FIG. 1 is a schematic view showing a tractor and a trailer, operatively connected to it by a cardan, during straight travel.

FIG. 1 represents a tractor 1 with a trailer 2; the trailer 2 is operatively connected to the tractor 1 via a cardan 3 which allows the transmission of energy through a power outlet from the tractor 1 to the trailer 2. First, the tractor 1 is a good example of a vehicle to which the present invention relates, although other vehicles could use it; therefore, whenever the tractor 1 is mentioned, any vehicle to which a trailer 2 can be connected with an operative connection through a cardan 3 will have to be considered included in the discussion, although the tractor remains the preferred vehicle. It is also to be remembered that the operative connection obtained with the cardan 3 does not include the physical junction and the towing action, which occur, on the other hand, by hooks and eyes which, for reasons of visibility, are not shown in the figures, although they are surely present.

The cardan 3 is connected, as said, to a power take-off (not shown in the drawings), said power take-off being disengaged when said cardan 3 forms with said vehicle 1 and/or with said trailer 2 an angle ε below a first threshold value (α) and/or over a second threshold value (β) and being inserted when said angle exceeds again said first threshold value α or goes below said second threshold value β thanks to suitable actuators cooperating with means for detecting the angle ε formed between the cardan 3 and the said vehicle 1 and/or trailer 2. Advantageously, said smaller threshold angle α is 35° while said upper threshold angle β is 145° since, up to such angles, the operation of the power take-off does not have a negative effect on the cardan 3 and its integrity.

According to the present invention, a magnet 4 is provided on the trailer 2, or in its immediate vicinity on the cardan 3. Conversely, on the vehicle 1—generally near the cardan 3—or on the cardan 3, in the immediate vicinity of the vehicle 1, an electronic compass 5 of a type per se known is provided. The magnet 4 can be a permanent magnet, or it can be an electromagnet, which comes into operation with the engine of the vehicle 1 from which it draws energy and acts on the compass 5, superimposing to the geographic north, thanks to the short distance and intensity of the magnet 4, and constituting a "fake north", suitable for guiding the compass 5. The signal from the compass 5 is transmitted to a processing unit capable of acting on the actuator means.

Figure 4:
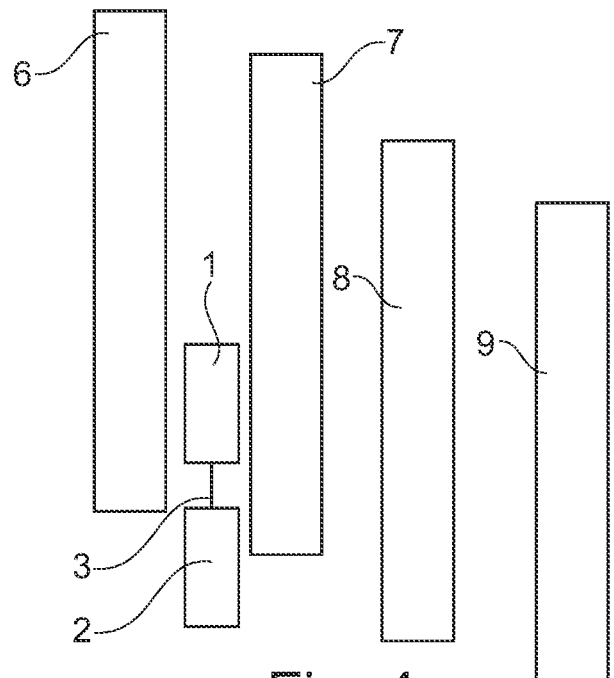
FIG. 4 is a schematic view representing a tractor and a trailer, operatively connected to it by a cardan, during straight travel, in a series of staggered rows.
Figure 5:
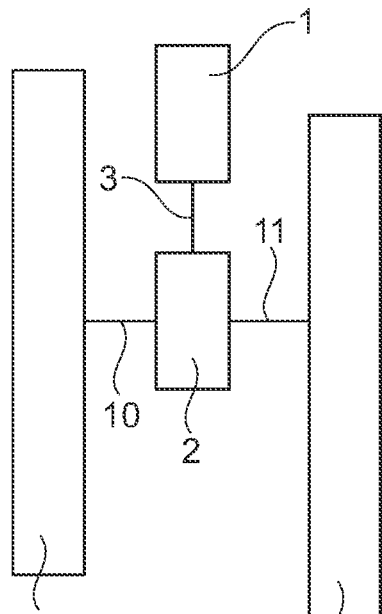
FIG. 5 shows a preferred embodiment of the present invention, in the situation of FIG. 4.
Figure 6:
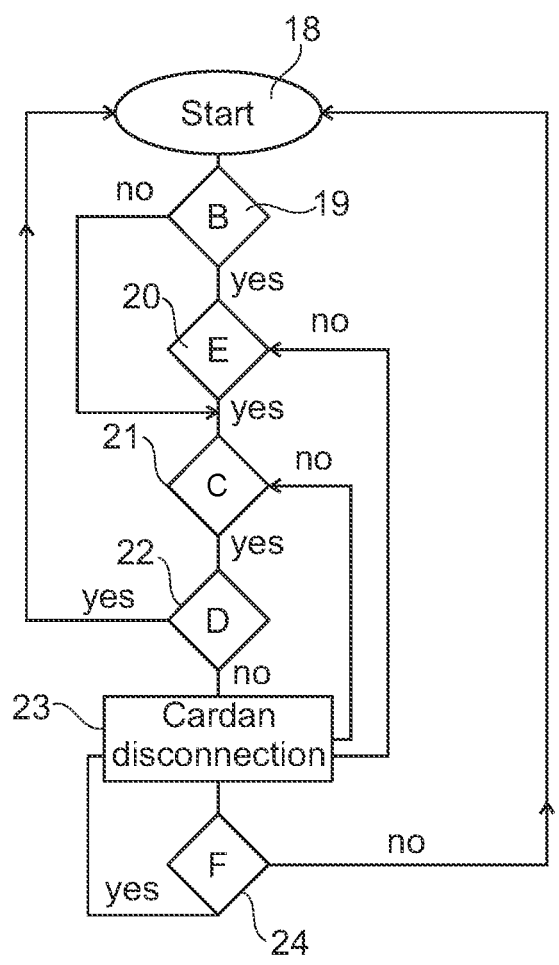
FIG. 6 is a block diagram representing a part of a further alternative embodiment according to FIG. 5.

FIGS. 4 to 6 show a particularly advantageous embodiment of this invention. The tractor 1 and the vehicle 2 are represented, operatively connected by the cardan 3, in a series of rows 6 to 9. In such cases, when vehicle 1 terminates to work on a row (e.g. 7), it cannot start bending due to the presence of a longer row 6. As can be easily seen in FIG. 4, rows 6 to 9 are of lengths different from each other. According to the embodiment shown in these figures, the tractor 1 and/or the trailer 2 (as shown in FIG. 5) has a pair of side probes 10 and 11, one on each side of the vehicle 1 and the trailer 2, arranged at a height considered appropriate. A central processing system is connected both to the compass 5 and to each of the probes 10, 11, for receiving signals from each of them. Said probes (10, 11) are adjustable-length rods.

The probes 10, 11 may be of any known type, such as electrovalves, photoelectric cells or other devices known per se. They may be bolted to vehicle 1 or a movably fixed, provided they are sufficiently firm. In case two electrovalves are used, they can be of the always active type, which is deactivated by the lack of contact, and of the always inactive type, which is activated by the lack of contact.

Preferably, the probes 10, 11 are fixed to vehicle 1 in a removable manner and have varying lengths, so as to provide greater versatility.

During the straight travel of the vehicle 1, the situation is as shown in FIG. 1. The magnet 4 and the electronic compass 5 are activated when the vehicle 1 is started with the trailer 2. The magnetic field emitted by the magnet 4 is constantly detected by the electronic compass 5, which sees the north—actually a false north—thus pointing towards it.

Figure 2:
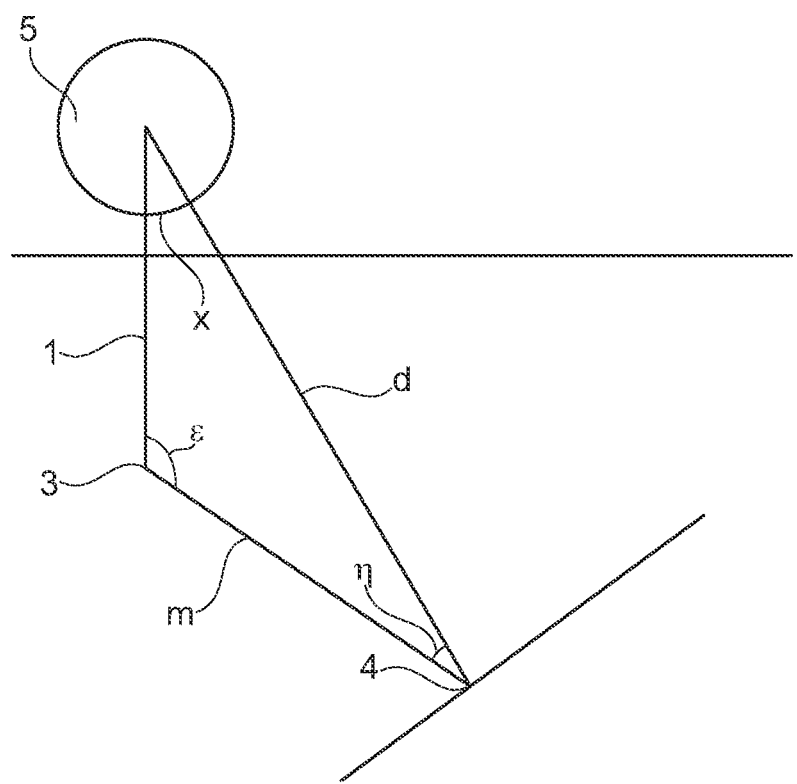
FIG. 2 is a schematic view showing system components during a bend.

At the moment when vehicle 1 runs a bend, the situation is the one generally represented in FIG. 2. An angle ε is formed on cardan 3. When the angle ε exceeds a certain threshold value or falls below another threshold value, the cardan 3 becomes at risk of breaking if the power take-off is not excluded. For this reason, when the first threshold value is exceeded or when the angle ε goes below a second threshold value, the power take-off is switched off, according to a programme suitably set in the processing system of the vehicle 1, due to the impulse of actuator means, specially provided on vehicle 1. At the same time, in order for the trailer 2 to take advantage of the desired result, it is necessary that when one threshold value or the other are exceeded in the opposite direction, the power take-off is switched back on. In order to determine the value of the angle ε so as to check whether it has exceeded one or the other of the threshold values, in one sense or another, the present invention involves the use of the magnet 4 and the electronic compass 5. The angle ε is a function of the angle which creates between the direction from the compass 5, normally placed on the vehicle 1, to the magnet 4, normally placed on the trailer 2, and the straight alignment of vehicle 1 and trailer 2. Of course, an arrangement with the compass 5 on the trailer 2 and the magnet 4 on the vehicle 1 will work in exactly the same way and will fully fall within the scope of the present invention.

The angle between the compass 5 and the magnet 4 is determined by the compass 5, which is oriented according to the position of the magnet 4 which, as mentioned above, replaces the geographic north as a fake north, and its correlation with angle ε may be carried out according to the most common methods known in the art. In practice, during the entire travel of the vehicle 1 and the trailer 2, the compass 5 detects the angle between the compass 5 and the cardan 3, bi-univocally connected to the angle ε, and transmits it to a processing unit (for example, a motor control unit) and correlates it to obtain the value of the angle ε which is formed at the cardan 3.

When it is determined that the angle ε becomes smaller than a threshold value (e.g., preferably 145°) or greater than a second threshold value (e.g., and preferably 360°-35°, i.e., 180°+145°, i.e. 325°), the processing unit sends to the actuator means a signal which, in a manner known per se, disengages the power take-off so that the joint with the cardan 3 stops rotating, thereby preserving the integrity of the same cardan 3. The vehicle will continue to travel along the bend, until it finishes its path and resumes its normal travel.

Once the angle returns above the first threshold value (e.g., preferably 145° or below a second threshold value (e.g., and preferably 360° to 35°, i.e. 180°+145°, i.e. 325°), the processing unit sends a signal which, in a known manner, causes, thanks to the same actuator means, the power take-off to be switched back on, so that the machine mounted on the trailer 2 (for example, but not limited thereto, a sprayer, a mower, a crushing machine, a hedger) will be restarted, avoiding an excessively long interruption, which would compromise the quality of the performed work.

In practice, by using the device according to the present invention, movement occurs by obviating the opposite disadvantages of cardan breakage and insufficient work performance, avoiding both extremes in a useful and advantageous way.

Figure 3:
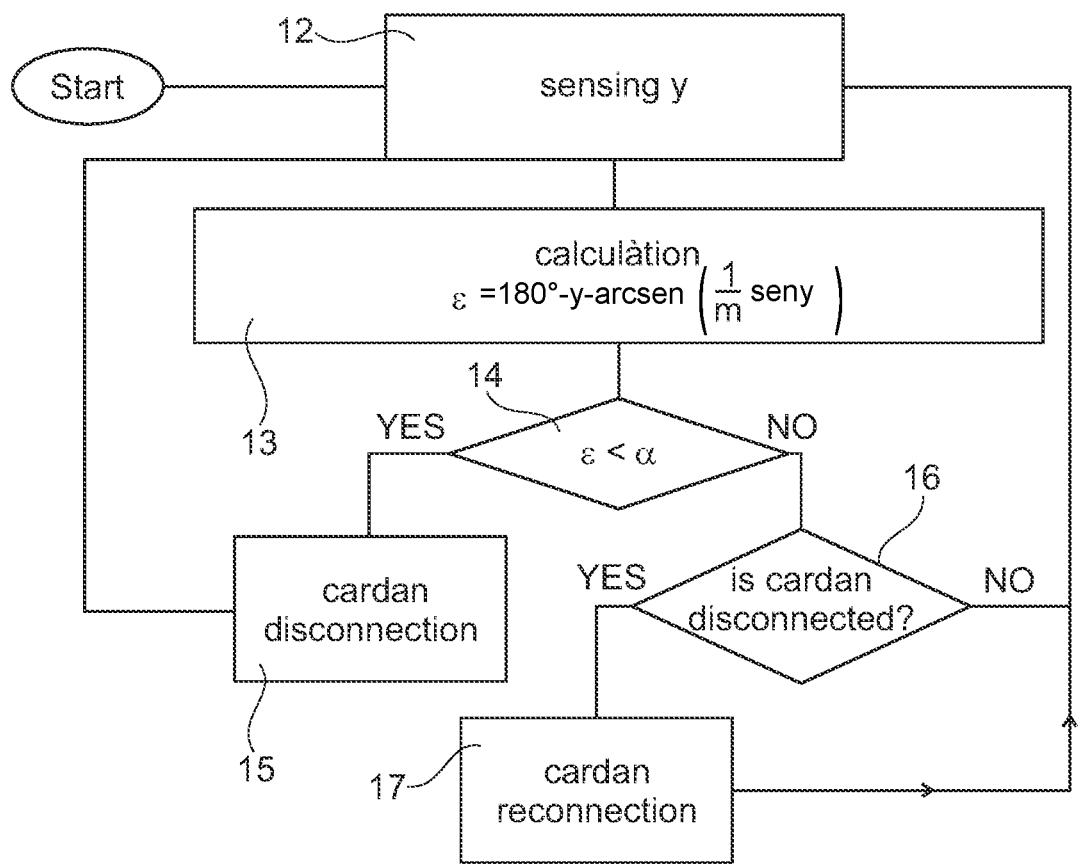
FIG. 3 is a block diagram illustrating a way of operating of the system according to an exemplary embodiment of the present invention.

As for the correlation mechanisms, a preferred embodiment is illustrated in FIGS. 2 and 3.

For clarification purposes, the distance between the cardan 3 and the compass 5 is indicated by letter l, while the distance between the cardan 3 and the magnet 4 is indicated by letter m. Advantageously, l and m are constant values during vehicle travel, depending solely on the relative arrangement of the cardan 3, the magnet 4 and the compass 5, as there is no reason to slide the magnet 4 or the compass 5 in a translational direction. In a further preferred way, l and m are manufacturing data of the vehicle 1 and of the trailer 2 contained in the vehicle processing unit 1 so that it is not necessary to set them at each start of the vehicle 1 itself. At the moment of the bend, the angle between the distance d between the magnet 4 and the electronic compass 5 and the side l is called γ, while the angle between the distance of the side m is called η.

The situation that is being created is, according to trigonometry:

$$\eta = \text{arcsen}\,(l/m\ \text{sen}\ \gamma) \qquad (2)$$

similarly to what happened with formula (1) mentioned in the introduction.

Taking into account that the sum of the angles inside a triangle (in this case the triangle 3, 4, 5) is 180°, formula (2) can also be written as:

$$\varepsilon = 180 - \gamma - \text{arcsen}\,(l/m\ \text{sen}\ \gamma) \qquad (3)$$

Therefore, the angle ε which insists on the cardan 3 is immediately obtained according to the formula:

$$\varepsilon = 180 - \gamma - \text{arcsen}\,(l/m\ \text{sen}\ \gamma) \qquad (3)$$

where γ is the angle the compass 5 makes with respect to the straight travel with the magnet 4, l is the distance between the cardan 3 and the compass 5, m is the distance between the cardan 3 and the magnet 4.

The necessary and sufficient condition for formula (3) to obtain the exact angle ε is that the compass 5 and the magnet 4 are on the same straight line during the straight travel of the vehicle 1 and the trailer 2. As can be immediately seen, formula (3) allows to obtain the angle ε (which insists on cardan 3) only as a function of the angle γ, which is continuously measured by the electronic compass 5 without the need for any other measure, so that the calculations are extremely simple, without an excessive computing load in the processing unit of the vehicle 1.

By calling the smaller threshold angle α, the processing unit executes the process shown in FIG. 3. The processing unit must set the value of the threshold angle α, the values of l and m and the process shown in FIG. 3 before the start of the travel of vehicle 1. The processing unit will continuously receive the γ data, measured by the electronic compass 5, by evaluating the displacement of the artificial north (the magnet 4) with respect to the straight travel.

In step 12, a value of γ is detected by compass 5 and transmitted to the processing unit. In the next step 13, the value of ε is calculated based on the detected value of γ. In step 14, the value of ε is compared to the value of α.

If the value of ε is lower than the value of α, the process continues with step 15, in which the power take-off is disengaged and the cardan 3 stops rotating. Subsequently, the process returns to step 12 and resumes.

If the value of ε is higher than the value of α, the process continues with step 16, the system checks whether the power take-off is disengaged.

If it is disengaged, the process continues with step 17, the power take-off is reinserted and the cardan 3 restarts its rotation. Subsequently, the process goes back to step 12, the process resumes from the first step.

If the power take-off is not disengaged, the process returns from step 16 to step 12 and resumes from the beginning.

Analogous reasoning is for the second threshold angle β, the condition to be tested in 14 being now ε<β rather than ε>α.

The embodiment shown in FIGS. 4 to 6 adds further advantages to what has so far been shown, since it avoids spraying substances that are not particularly beneficial to the environment (such as fertilisers) or are even harmful (as pesticides) when there is no row or hedge to work on.

During travel, the probes 10 and 11 come into contact with the rows, for example 6 and 7, and are forcefully inclined by them towards the rear of vehicle 1. When one or both of the probes 10, 11 are no longer in contact with rows 6 or 7, respectively, they return to their original position perpendicular to the axle of the vehicle 1. When this happens, a signal is sent to the processing unit that disengages the power take-off even if the travel of the vehicle 1 and the trailer 2 is straight. In this way, continuation of work in the absence of rows is avoided and material is saved, avoiding an unnecessary burden on the environment.

The process that is being created is that shown in FIG. 6, where the letters in the boxes have the following meanings: B indicates the towed tool, C indicates the sensor of 10 felt something from less than τ, D indicates the sensor of 11 felt something from less than τ, E indicates the angle between the tractor 1 and the trailer 2 is greater than α, F indicates a time less than or equal to τ has passed from the disengagement of the power take-off.

The process starts in step 18, checking in step 19 whether there is a towed or carried tool.

If the tool is towed, the process moves to step 20 or, if it is carried, to step 21.

In step 20, a check is performed to see if ε is greater than α. If so, the process goes to step 21, otherwise it goes to step 23.

At step 21, a check is performed to see if the sensor of 10 has felt something from a time less than τ. If so, the process goes to step 22, otherwise it goes to step 23.

At step 22, a check is performed to see if the sensor of 11 has felt something from a time smaller than τ. If so, the process goes back to step 18 and resumes, otherwise it goes to step 23.

At step 23, the power take-off is disengaged, going on to step 24.

Step 24 occurs if a power take-off disengagement time of less than τ has passed. If so, the check is repeated remaining at step 24, otherwise the process resumes at step 18.

As can be seen, the present invention may be applied to any type of vehicle operatively connected to a trailer with a cardan, providing for the automatic engagement and disengagement of the power take-off if the angle formed on the cardan 3 is dangerous for the integrity of the cardan 3 itself in case of continuation of its rotation. Contrary to the prior art systems, the arrangement of the fake north (magnet 4) and the electronic compass 5 allows to determine the angle that insists on the cardan 3 regardless of the type of vehicle 1 and trailer 2, which may include vehicles of any kind, with wheels or tracks or even a tracked vehicle and a wheeled trailer or a wheeled vehicle and a tracked trailer, the only parameter to be measured being the deviation angle (γ) of the magnet 4—fake north—compared to the straight travel, such angle being continuously monitored by the electronic compass 5.

The embodiment shown in FIGS. 4 to 6 adds to the safety of the integrity of the cardan 3 also energy and material savings, linked to the suspension of processing in the absence of plants to work on, so that the trailer can also be used in the case of staggered rows, without this involving wastes or parts of unprocessed plants and avoiding unnecessarily burdening the environment.

Figure 7:
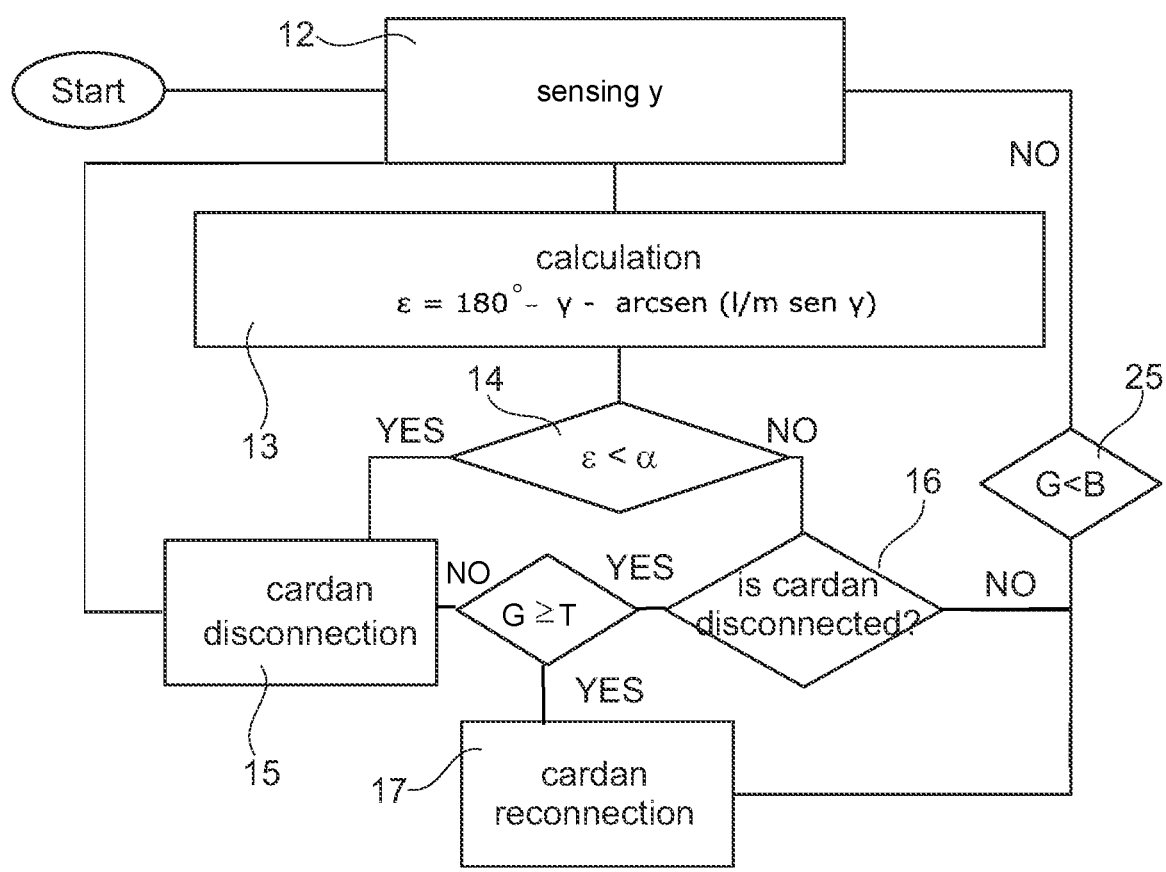
FIG. 7 is a block diagram illustrating a mode of operation of the system according to an embodiment of the present invention, alternative to that shown in FIGS. 4 to 6.

As an alternative to the embodiment shown in FIGS. 4 to 6, it is possible to use, for the same purposes, without the need of sensors 10, 11, the embodiment shown in FIG. 7, which makes use of an apparatus similar to that of the embodiment shown in FIG. 3, providing the detection of speed and its comparison with threshold values, taking into account that work on rows provides—almost for a Pavlovian type of response—a higher speed than when travelling in areas without work to be performed (the manoeuvre tends to slow down as soon as the rows are finished).

Once the vehicle 1 starts to travel, the angle γ is detected at step 12. At the same time, speed G is detected. Generally, if the tractor has a low speed, it means that it is describing a wide curve to switch from one row to another row and it will not be performing work, while a high speed G indicates work in progress. The speed G, with the switched-on power take-off, is compared with a smaller limit speed B at step 25.

If G>B, the process continues to the next step 13, where the angle ε is calculated according to formula (3):

$$\varepsilon = 180 - \gamma - \arcsen(l/m \operatorname{sen} \gamma) \quad (3)$$

If G<B, the power take-off is switched off anyway. At the next step 14, the angle ε is compared with the threshold angle α and, if it is smaller, the cardan 3 is disconnected at step 15; contrarily, if it is greater, the process goes to the next step 16. At step 16, a check is performed to see whether the cardan is connected or not.

If the result of step 16 is that the cardan 3 is disconnected, the speed G is re-detected and if the value G is greater than the upper threshold value T, the cardan is re-connected in the next step 17 otherwise it remains disconnected. Indeed, a speed G greater than the threshold T means that the tractor is operating close to a row 6, 7, 8 or 9.

In practice, the system according to this embodiment also comprises means for testing the speed G of the vehicle and means for comparing said speed with a smaller limit value B, so that if G<B the power take-off is disengaged. In addition, to complete the process, the system also includes means for comparing said speed G with a higher limit value T, so that if G>T and ε<α the power take-off is switched back on.

In this way, it is possible to save on working when there are no rows, without the need for probes 10 or 11.

It is understood, however, that the invention is not to be considered as limited by the particular arrangement illustrated above, which represents only an exemplary implementation of the same, but different variants are possible, all within the reach of a person skilled in the art, without departing from the scope of the invention itself, as defined by the following claims.

LIST OF REFERENCE NUMERALS

1 Vehicle
2 Trailer

3 Cardan
4 Magnet
5 Electronic compass
6 Row
7 Row
8 Row
9 Row
10 Side probe
11 Side probe
12 Process step
13 Process step
14 Process step
15 Process step
16 Process step
17 Process step
B Towed tool
C Detection
D Detection
E Angle comparison
F Time from detection
18 Process step
19 Process step
20 Process step
21 Process step
22 Process step
23 Process step
24 Process step
25 Process step
α Lower threshold angle
β Upper threshold angle
γ Angle between cardan (3) and compass (5)
ε Angle on the cardan
η Angle between cardan and magnet (4)

The invention claimed is:

1. A system for disconnecting a power take-off in a vehicle which is operatively connected to a trailer via a cardan, said system comprising a detection means for disconnecting said power take-off when said cardan forms with said vehicle and/or with said trailer an angle ε smaller than a first threshold value α and/or greater than a second threshold value β, and connects the power take-off when said angle ε exceeds said first threshold value again and/or goes below said second threshold value β via one or more actuators, said one or more actuators cooperating with said detection means for detecting the angle formed between the cardan and said vehicle and/or trailer, wherein said detection means includes a magnetic device placed on the trailer or vehicle and an electronic compass arranged on the vehicle or on the trailer such that the detection means detects measurements corresponding to said angle ε.

2. The system of claim 1, wherein said compass is placed on the vehicle near the cardan or on the cardan near the vehicle.

3. The system of claim 1, wherein said magnetic device is selected from a permanent magnet and an electromagnet, which comes into operation with the motor of the vehicle via the power take-off.

4. The system of claim 1, wherein said first threshold angle is 145° and said second threshold angle β is 325°.

5. The system of claim 1, wherein the angle ε of the cardan is obtained according to a computation of: $\varepsilon = 180 - \gamma - \arcsen(I/m \, \sen \gamma)$ where γ is an angle the compass forms with respect to straight travel with the magnet, I is a distance between the cardan and the compass, and m is a distance between the cardan and the magnet.

6. The system of claim 1, wherein the compass and the magnetic device are on a common axis during the straight travel of the vehicle and the trailer.

7. The system of claim 1 further comprising means for checking the speed (G) of the vehicle and means for comparing said speed with a smaller limit value(B), so that if G<B the power take-off is disconnected.

8. The system of claim 7 further comprising means for comparing said speed (G) with a higher limit value (T), so that if G>T and ε<α, where α is the first threshold value, the power take-off is connected.

9. The system of claim 1, wherein the vehicle and/or the trailer have a pair of side probes, one of said pair of side probes being positioned on each side of the vehicle and/or of the trailer.

10. The system of claim 9, wherein the side probes are at least one of electro-valves and photoelectric cells.

11. The system of claim 10, wherein said side probes are electro-valves having an active state, which are deactivated by lack of contact.

12. The system of claim 11, wherein said side probes are electro-valves having an inactive state, which are activated by contact.

13. The system of claim 9, wherein said side probes are adjustable-length rods.

14. The system of claim 9, wherein the side probes are removably fixed and have varying lengths.

* * * * *